(12) United States Patent
Sevindik

(10) Patent No.: US 12,200,668 B2
(45) Date of Patent: Jan. 14, 2025

(54) WIRELESS NETWORK AND PHASE CONTROL

(71) Applicant: Charter Communications Operating, LLC, St. Louis, MO (US)

(72) Inventor: Volkan Sevindik, Reston, VA (US)

(73) Assignee: Charter Communications Operating, LLC, St. Louis, MO (US)

( * ) Notice: Subject to any disclaimer, the term of this patent is extended or adjusted under 35 U.S.C. 154(b) by 507 days.

(21) Appl. No.: 17/506,842

(22) Filed: Oct. 21, 2021

(65) Prior Publication Data

US 2023/0132352 A1   Apr. 27, 2023

(51) Int. Cl.
| | |
|---|---|
| *H04W 72/04* | (2023.01) |
| *H04B 7/155* | (2006.01) |
| *H04W 56/00* | (2009.01) |

(52) U.S. Cl.
CPC ............ *H04W 72/04* (2013.01); *H04B 7/155* (2013.01); *H04W 56/004* (2013.01)

(58) Field of Classification Search
CPC . H04W 72/04; H04W 56/004; H04W 72/046; H04W 88/04; H04B 7/155; H04B 7/15507; H04B 7/15528; H04B 7/15592; H04B 7/0617; H04B 7/043; H04B 17/12; H04B 7/024; H04B 7/0408; H04B 7/15585; H04B 7/1555
See application file for complete search history.

(56) References Cited

U.S. PATENT DOCUMENTS

| | | | |
|---|---|---|---|
| 4,827,474 A * | 5/1989 | Le Goffic | H04B 7/24 370/347 |
| 10,979,908 B2 * | 4/2021 | Singh | H04W 72/04 |
| 2005/0136835 A1 * | 6/2005 | Suwa | H04B 7/155 455/11.1 |
| 2009/0086666 A1 * | 4/2009 | Guvenc | H04L 1/02 370/328 |
| 2010/0014453 A1 * | 1/2010 | Erkip | H04L 1/0003 370/315 |
| 2011/0142104 A1 * | 6/2011 | Coldrey | H04B 7/1555 375/211 |
| 2018/0010911 A1 * | 1/2018 | Fang | G01C 3/18 |
| 2020/0059794 A1 * | 2/2020 | Singh | H04W 72/04 |
| 2021/0329581 A1 * | 10/2021 | Mehrabani | H04B 7/15557 |
| 2023/0199659 A1 * | 6/2023 | Zhou | H04W 56/004 |
| 2023/0354127 A1 * | 11/2023 | Fazili | H04B 7/0617 |

FOREIGN PATENT DOCUMENTS

EP         2280497 A2 *   2/2011   ............. H04B 7/155

* cited by examiner

*Primary Examiner* — Lana N Le
(74) *Attorney, Agent, or Firm* — Armis IP Law, LLC

(57) ABSTRACT

A communication system includes multiple repeater wireless stations and communication management hardware. The multiple repeater wireless stations receive first wireless signals from a wireless base station. The multiple repeater wireless stations transmit second wireless signals from the multiple repeater wireless stations to a mobile communication device. The second wireless signals are reproductions of the first wireless signals. The communication management hardware controls phase shifts of the second wireless signals in time such that the second wireless signals received by the mobile communication device are phase aligned.

30 Claims, 10 Drawing Sheets

FLOWCHART 700

WIRELESS NETWORK AND PHASE CONTROL

BACKGROUND

Conventional wireless networks typically include one or more wireless base stations to provide mobile communication devices access to a remote network such as the Internet. One type of base station is a so-called CBSD (Citizen Broadband Radio Service Device). Such a device uses one or more wireless channels allocated from a CBRS (Citizens Band Radio Service) band to support communications with one or more mobile communication devices. Typically, the one or more wireless channels are allocated to the base station via a so-called SAS (Spectrum Access System).

Subsequent to registration and wireless channel allocation, the wireless base station communicates so-called heartbeat request messages to the spectrum access system in order to continue use of the allocated one or more wireless channels. For example, the customer premises equipment is able to continue using the allocated wireless channel for an appropriate duration each time the SAS communicates a heartbeat response to the customer premises equipment.

In a CBRS system, as previously discussed, the SAS (Spectrum Access System) is used to allocate (authorize/unauthorize) radio resources to CBSDs based on a request from a CBSD; the spectrum allocation/grant to the CBSD can be in a chunks of 10 MHz or 20 MHz and up to 100 MHz assuming LTE (Long Term Evolution) operation.

As in 4G, RF repeaters are used in 5G to increase respective wireless network coverage. For example, conventional repeaters simply repeat the received wireless RF signal they receive from gNB in both downlink (DL) and uplink (UL) directions. For 4G applications, this simple method works. However for 5G, because of the beam based communication, repeaters do not perform well with their conventional working model.

In 5G, each UE receives a highly directed beam from gNB, and this focused beam is possible based on advanced antenna systems implemented by gNB. Such a system is typically is expensive. Accordingly, RF repeaters do not implement this antenna system. When a conventional RF repeater receives an RF signal in a focused form, it will omni-directionally re-transmit the received signal.

BRIEF DESCRIPTION OF EMBODIMENTS

Embodiments herein include multiple repeater wireless stations to provide improved wireless connectivity with respect to conventional techniques. For example, embodiments herein include implementing the repeater wireless stations as discussed herein to repeat the signals from a wireless base station in a same form as they are transmitted from the wireless base station. However, as further discussed herein, beamforming is achieved at the spaced-apart repeater wireless stations by implementing appropriate phase shifts of the wireless signals from the wireless base station and/or wireless signals from the repeater wireless stations, resulting in a strong signal received at a target mobile communication device to which the signals from the repeater wireless stations are directed.

This disclosure presents a method to leverage RF repeaters to improve wireless connectivity in a network environment. Embodiments herein provide novel ways of providing improved wireless communications to one or more communication devices in a network environment.

More specifically, in one embodiment, a communication system includes multiple repeater wireless stations and a communication management resource. The repeater wireless stations receive first wireless signals from a wireless base station and transmit second wireless signals from the multiple repeater wireless stations to a mobile communication device. In one embodiment, the second wireless signals are reproductions of the first wireless signals. For example, the second wireless signals are transmitted from the repeater wireless stations in substantially the same form (wireless frequency) as the received first wireless signals. The communication management resource (such as controller or other suitable entity) controls phase shifts (time delays) of the second wireless signals from the repeater wireless stations such that the second wireless signals received by the mobile communication device are phase aligned. Thus, in one embodiment, the second wireless signals received by the mobile communication device are substantially in phase with each other. The receiving mobile communication device receives a strong signal, which is a replica of the first wireless signals from the wireless base station.

Phase alignment and constructive interference of the second wireless signals received by the mobile communication device provide a strong wireless signal for processing by the mobile communication device, reducing a likelihood of communication failures and supporting increased wireless data rates (lower rate of lost data).

Magnitudes of the phase shifts associated with the second wireless signals can be achieved in any suitable manner. For example, in one embodiment, magnitudes of the phase shifts of the second wireless signals are controlled by the communication management hardware depending on one or more parameters such as: i) first time of flight distances between the wireless base station and the multiple repeater wireless stations, and ii) second time of flight distances between the multiple repeater wireless stations and the mobile communication device.

In still further example embodiments, the communication management resource (such as implemented via hardware, software, or a combination of hardware and software) is operative to: receive first location information indicating locations of each of the multiple repeater wireless stations; determine first time of flight distances between the wireless base station and the multiple repeater wireless stations; and control the phase shifts of the second wireless signals in time with respect to the first wireless signals based at least in part on the first time of flight information. The communication management resource is further operative to: receive second location information indicating a location of the mobile communication device; determine second time of flight distances between the multiple repeater wireless stations and the mobile communication device; and control the phase shifts of the second wireless signals in time with respect to the first wireless signals based on the second time of flight information. Phase shifts can be adjusted or controlled at any one or more transmission sources such as the wireless base station, repeater wireless stations, etc.

In further example embodiments, the communication management resource determines the phase shifts based at least in part on distances between the multiple repeater wireless stations and/or their respective locations.

Further example embodiments herein include, via the communication management resource, generating phase shift control information indicating one or more different phase shifts. The wireless base station communicates the phase shift control information to the multiple repeater wireless stations. The multiple repeater wireless stations, in turn, implement the phase shifts as specified by the phase shift control information. This includes application of the phase shifts to the second wireless signals transmitted from the wireless base station. Additionally, or alternatively, the communication management resource communication management hardware implements the phase shifts at the wireless base station via phase shifting of the first wireless signals transmitted to the multiple repeater wireless stations.

In further example embodiments, the communication management resource controls transmission of the first wireless signals from the wireless base station such that the first wireless signals are substantially in phase with each other, resulting constructive interference and a strong received signal.

Still further example embodiments herein include, via the communication management resource, registering the wireless base station with an allocation management resource for allocation of a wireless channel in which to transmit the first wireless signals from the wireless base station and the second wireless signals from the repeater wireless stations.

In yet further example embodiments, the communication system as discussed herein includes a wireless base station, multiple repeater wireless stations, and a mobile communication device.

The wireless base station (such as a CBSD) turns on and connects with an allocation management resource (such as spectrum access system).

The allocation management resource (SAS) grants spectrum (such as one or more wireless channels) for use by the wireless base station CBSD.

UE such as a mobile communication device is connected to the wireless base station CBSD; the wireless base station CBSD starts creating wireless beams for the UE using certain number of antennas depending on parameters such as:
  Directivity of the beam,
  Total power of the beam Each mobile communication device (such as user equipment or UE) reports its location to the communication management resource. Additionally, or alternatively, the communication management resource retrieves location information indicating a location of the mobile communication device.

Repeater wireless stations repeaters (such as Radio Frequency repeaters) connect with wireless base station as a regular UE type of device. However, via registration, the wireless base station CBSD knows which devices in the network are user equipment and which are repeaters. So, during the process of registration with the wireless base station (such as CBSD), each terminal provides notification of its category type, indicating whether it is a mobile communication device (UE), repeater wireless station, stationary wireless base station, etc.

In further example embodiments, each wireless base station (CBSD) knows how many repeaters are connected to itself, each CBSD will also report its location to the spectrum access system or allocation management resource.

In one embodiment, coverage extension is needed for those instances of UEs on a respective cell edge so that the respective mobile communication device (UE) can stay connected with the current wireless base station CBSD as long as needed.

In further example embodiments, the wireless base station (such as CBSD) knows which UE is on the cell edge using a received 'power headroom' report. If the power headroom=0, that means UE is on the cell edge. In other words, in accordance with the power headroom report, if the wireless signals received by the mobile communication device from the wireless base station are very low power, the mobile communication device is determined to be near a cell edge of the wireless base station. Additionally, or alternatively, the communication management resource as discussed herein can be configured to receive or retrieve location information indicating a location of the mobile communication device. The location information indicates whether the mobile communication device is near a respective cell edge requiring support by one or more repeater wireless stations.

The wireless base station (CBSD) tracks how many antennas of the wireless base station that are used to create a beam for a respective mobile communication device (UE). For instance, if the wireless base station (such as CBSD) implements 4 antennas during beamforming to communicate with the user equipment (i.e. mobile communication device), each antenna will transmit a different phase-shifted version of the same signal based on the beamforming. In one embodiment, the amount of phase shift applied by a respective wireless base station to each signal is determined based on parameters such as the distance between respective antennas (transmitter and receiver) as well as respective location of the repeater wireless stations. The purpose is that when all these four signals are transmitted from the wireless base station and/or repeater wireless stations, and they are properly phase shifted as discussed herein, when the wireless signals from the repeater wireless stations reach the target mobile communication device, the peak values of these phase shifted signals constructively add as a strong signal for processing by the mobile communication device in the downlink.

The wireless base station uses the repeater wireless stations to transmit the repeated wireless signal(s) to the UE at the cell edge, and performs the following operations:

Since the wireless base station tracks how many antennas that are used by the wireless base station CBSD uses to transmit a respective downlink signal directly to the mobile communication device (not through repeater wireless stations), the wireless base station selects the same number of repeater wireless stations (one repeater wireless station per previously used antenna) to communicate indirectly with the mobile communication device. For instance, if the wireless base station uses 4 antennas to transmit the signal directly to the mobile communication device, then CBSD will select 4 repeater wireless stations to communicate with the mobile communication device.

Next, depending on the location of mobile communication device (UE), the wireless base station selects repeaters starting from those nearest to the mobile communication device. These are most likely to provide best wireless connectivity to the mobile communication device.

The communication management resource such as associated with the wireless base station and repeater wireless stations calculate the distance between repeater wireless stations.

The wireless base station determines the correct phase shift (adjustment) values to be applied by each repeater wireless station. The wireless base station communicates the phase shift information (such as phase shift values to be applied by the repeater wireless stations) to the repeater wireless stations. In one embodiment, the wireless base station sends this information in advance to each repeater wireless station.

In further example embodiments, rather than send phase shift control information to the repeater wireless stations, the wireless base station sends normal (no phase adjustment) signals to each repeater in a way that the signal reaches all repeater wireless stations at the same time. In one embodiment, the communication management resource associated with the wireless base station does this by calculating the distance between itself and each of the repeater wireless station. The wireless base station simply will transmit the signal earlier to a repeater located very far from the UE.

Each repeater re-transmits, at the same or different times, the received primary signal as a secondary wireless signal with the correct phase adjustment such that the mobile communication device generally receives the secondary wireless signals as being phase aligned. In one embodiment, each of the repeater wireless stations transmits the respective secondary wireless signal in all directions in the network environment. The UE (i.e., mobile communication device) receive the secondary transmitted wireless signals from each of the repeater wireless stations.

Each of the repeater wireless stations repeats this operation for one or more other communication devices present near a respective cell edge.

Embodiments herein are useful over conventional techniques. For example, embodiments herein include unique ways of providing efficient use of wireless services via transmission of different time delayed instances of a same wireless signal.

Note further that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and handoffs in a network environment. The instructions, when executed by computer processor hardware, cause the computer processor hardware (such as one or more co-located or disparately processor devices or hardware) to manage operation of multiple repeater wireless stations, the multiple repeater wireless stations operative to: receive first wireless signals from a wireless base station; transmit second wireless signals from the multiple repeater wireless stations to a mobile communication device, the second wireless signals being reproductions of the first wireless signals; and wherein phase shifts of the second wireless signals are controlled in time via the computer processor hardware such that the second wireless signals received by the mobile communication device are phase aligned.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
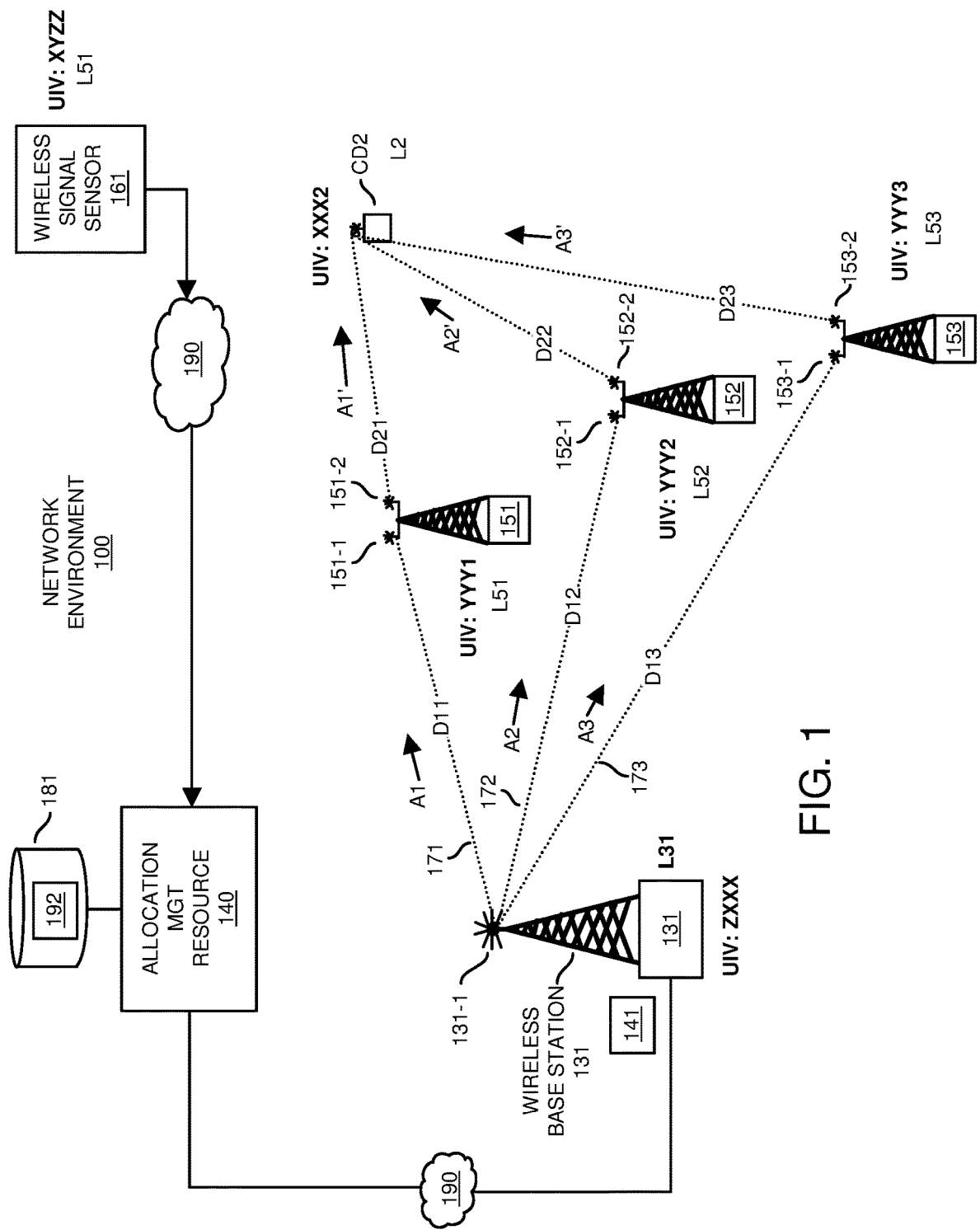
FIG. 1 is an example diagram illustrating a communication network environment and multiple wireless base stations implementing wireless communications according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As further discussed herein, a communication system includes multiple repeater wireless stations and communication management hardware. A set of the multiple repeater wireless stations receives first wireless signals from a wireless base station. The multiple repeater wireless stations transmit second wireless signals from the multiple repeater wireless stations to a mobile communication device. The second wireless signals are reproductions of the received first wireless signals. The communication management hardware controls phase shifts (time delays) the second wireless signals in time such that the second wireless signals received by the mobile communication device are substantially or better phase aligned.

Now, more specifically, with reference to the drawings, FIG. 1 is an example diagram illustrating a communication network environment and multiple wireless stations implementing wireless connectivity according to embodiments herein.

As shown, network environment 100 includes allocation management resource 140 (such as spectrum access system), wireless signal sensor 161, network 190, wireless base station 131, repeater wireless station 151, repeater wireless station 152, repeater wireless station 153, etc. Wireless network environment 100 includes any number of wireless base stations and corresponding repeater wireless stations.

As further shown, wireless network environment 100 further includes communication management resource 141. Communication management resource 141 can be located at any location (such as wireless base station 131, repeater wireless station 151, repeater wireless station 152, repeater wireless station 153, communication device CD2) in network environment 100 and provide any of the functionality as discussed herein.

Each of the wireless stations is assigned a respective unique identifier value (such as network address) supporting communication of wireless messages. For example, wireless station 131 is assigned unique identifier value ZXXX; wireless station 151 is assigned unique identifier value YYY1; wireless station 152 is assigned unique identifier value YYY2; wireless station 153 is assigned unique identifier value YYY3; communication device CD2 is assigned XXX2.

Each of the wireless base stations in network environment 100 includes respective one or more instances of antenna hardware to wirelessly communicate with mobile communication devices (a.k.a., user equipment). For example, in this embodiment, the wireless base station 131 includes at least antenna hardware 131-1 (such as one or more antenna elements). Different sets of the antenna elements associated with the antenna hardware 131-1 support different beamforming.

Each of the repeater wireless stations includes respective one or more instances of antenna hardware to wirelessly communicate (in a repeater mode) with mobile communication devices (a.k.a., user equipment). For example, the repeater wireless station 151 includes antenna hardware 151-1 (such as one or more antenna elements) to receive communications from and transmit communications to the wireless base station 131; the repeater wireless station 151 includes antenna hardware 151-2 (such as one or more antenna elements) to receive communications from and transmit communications to the communication device CD2 (a.k.a., wireless station). Thus, the repeater wireless station 151 provides wireless connectivity between the wireless base station 131 and the communication device CD2.

The repeater wireless station 152 includes antenna hardware 152-1 (such as one or more antenna elements) to receive communications from and transmit communications to the wireless base station 131; the repeater wireless station 152 includes antenna hardware 152-2 (such as one or more antenna elements) to receive communications from and transmit communications to the communication device CD2 (a.k.a., wireless station). Thus, the repeater wireless station 152 provides wireless connectivity between the wireless base station 131 and the communication device CD2.

The repeater wireless station 153 includes antenna hardware 153-1 (such as one or more antenna elements) to receive communications from and transmit communications to the wireless base station 131; the repeater wireless station 153 includes antenna hardware 153-2 (such as one or more antenna elements) to receive communications from and transmit communications to the communication device CD2 (a.k.a., wireless station). Thus, the repeater wireless station 153 provides wireless connectivity between the wireless base station 131 and the communication device CD2.

Note that each of the resources in network environment 100 can be configured to include or be configured as appropriate hardware, software, or combination of hardware and software to carry out respective operations as discussed herein.

More specifically, the communication management resource 141 as described herein can be implemented via respective communication management hardware, communication management software, or a combination of communication management hardware and communication management software; the wireless base station 131 as described herein can be implemented via respective wireless base station hardware, wireless base station software, or a combination of wireless base station hardware and wireless base station software; the allocation management resource 140 can be implemented via allocation management hardware, allocation management software, or a combination of allocation management hardware and allocation management software; repeater wireless station 151 can be implemented via repeater wireless station hardware, repeater wireless station software, or a combination of repeater wireless station hardware and repeater wireless station software; repeater wireless station 152 can be implemented via repeater wireless station hardware, repeater wireless station software, or a combination of repeater wireless station hardware and repeater wireless station software; repeater wireless station 153 can be implemented via repeater wireless station hardware, repeater wireless station software, or a combination of repeater wireless station hardware and repeater wireless station software; communication device CD2 can be implemented via communication device hardware, communication device software, or a combination of communication device hardware and communication device software; and so on.

The wireless network and corresponding wireless base stations, repeater wireless stations, communication devices, etc., as discussed herein can be configured to support any suitable wireless communication protocols. For example, in one embodiment, each of the wireless stations (i.e., wireless base stations, wireless access points, repeater wireless stations, communication devices, etc.) in network environment 100 can be configured to implement one or more wireless communication protocols such as Wi-Fi™, LTE communications, cellular communications, 4G communications, 5G communications, New Radio (NR), etc.

In still further example embodiments, note that the each of the wireless stations such as wireless base stations, repeater wireless stations, communication devices, etc., can be configured to operate in the CBRS band. For example, in one embodiment, via communications to the allocation management resource 140, each of the one or more wireless stations registers with the allocation management resource 140 (such as a spectrum access system) for allocation of one or more wireless channels to communicate in the network environment 100. In one embodiment, the allocation management resource 140 allocates wireless channel WCH #1 for use by the wireless stations.

In still further example embodiments, the wireless signal sensor 161 detects when an incumbent entity uses a respective one or more wireless channels. The wireless signal sensor 161 notifies the allocation management resource 140 of the incumbent entity and use. For example, in response to detecting use of the wireless channel #1 by the incumbent entity, the allocation management resource 140 revokes use of the wireless channel (such as wireless channel #1) by wireless stations in the network environment 100.

Wireless base station 131 (such as including circuitry, multiple semiconductor chips, processors, drivers, logic, etc.) controls transmission and reception of wireless communications such as signals A1, A2, and A3 from/to the antenna hardware 131-1. In one embodiment, the signals A1, A2, and A3 represent different instances of a same wireless signal A transmitted from the wireless base station 131, but which are potentially phase shifted (time delayed) or not phase shifted (not time delayed).

In further example embodiments, the antenna hardware 131-1 associated with the wireless base station 131 supports wireless beamforming. For example, the antenna hardware 131-1 can be configured to include any number of antenna elements to support simultaneous wireless beamforming of beams 171, 172, and 173 and corresponding signals A1, A2, and A3 in any suitable direction with respect to the wireless base station 131.

More specifically, in this example embodiment, the wireless base station 131 communicates with the allocation management resource 140 to register the wireless base station 131 for use of one or more wireless channels. The allocation management resource 140 allocates the wireless base station 131 use of wireless channel #1.

To communicate with the communication device CD2, in one embodiment, the wireless base station 131 simultaneously transmits wireless signals A1, A2, and A3 from antenna hardware 131-1 to the respective repeater wireless stations 151, 152, and 153. As previously discussed, the wireless base station 131 can be configured to support beamforming. In such an instance, via a first beam 171, the wireless base station 131 communicates wireless signal A1 to the antenna hardware 151-1 of the repeater wireless station 151; via a second beam 172, the wireless base station 131 communicates wireless signal A2 to the antenna hardware 152-1 of the repeater wireless station 152; via a third beam 173, the wireless base station 131 communicates wireless signal A3 to the antenna hardware 153-1 of the repeater wireless station 153.

In one embodiment, each of the wireless signals A1, A2 and A3 represent a different time shifted or time delayed instance of the same wireless signal A. Each instance of the signal A may be time shifted or not time shifted.

Accordingly, the combination of repeater wireless stations 151, 152, and 153 receive first wireless signals A1, A2, A3 from the wireless base station 131. For example, the repeater wireless station 151 receives signal A1; repeater wireless station 152 receives wireless signal A2; the repeater wireless station 153 receives wireless signal A3.

In further example embodiments, the wireless base station 131 supplies scheduling information indicating information such as times when to repeat received signals A1, A2, and A3, a carrier frequency of signals A1, A2, A3, etc. The repeater wireless stations use the schedule information as a basis to communicate determine what signals to repeat as well as in which time slots.

The repeater wireless stations transmit second wireless signals A1' (replica of receives wireless signal A1), A2' (replica of received wireless signal A2), and A3'(replica of receives wireless signal A3) from the multiple repeater wireless stations 151, 152, and 153 to the mobile communication device CD2. More specifically, repeater wireless station 151 transmits wireless signal A1'; repeater wireless station 152 transmits wireless signal A2'; repeater wireless station 153 transmits wireless signal A3'.

In one embodiment, as previously discussed, the second wireless signals A1', A2', and A3' are reproductions of the respective first wireless signals A1, A2, and A3. For example, the second wireless signals A1', A2', and A3' are transmitted at an appropriate power level from the repeater wireless stations in substantially the same form (wireless frequency) as the received first wireless signals A1, A2, and A3. The communication management resource 141 (such as a controller or other suitable entity associated with the wireless base station 131 or other suitable entity) controls phase shifts (time delays) of the second wireless signals A1', A2', and A3' from the repeater wireless stations 151, 152, and 153 such that the second wireless signals A1', A2', and A3' received by the mobile communication device CD2 are phase aligned.

As a more specific example, the communication management resource 141 or other suitable entity controls a phase shift (time delay) of the signal A1' (replica of wireless signal A1) from the antenna hardware 151-2; communication management resource 141 or other suitable entity controls a phase shift (time delay) of the signal A2' (replica of wireless signal A2) from the antenna hardware 152-2; communication management resource 141 or other suitable entity controls a phase shift (time delay) of the signal A3' (replica of wireless signal A) from the antenna hardware 151-3.

Thus, in one embodiment, the communication management resource 141, wireless base station 131 and/or repeater wireless stations control phase shifting of different instances of wireless signal A such that the second wireless signals A1', A2', and A3' received by the mobile communication device CD2 are substantially in phase with each other. In such an instance, the receiving mobile communication device CD2 receives a strong signal A, which is a replica of the combined first wireless signals A1, A2, and A3 from the wireless base station 131.

In further example embodiments, the signals A1, A2, and A3 have the same phase and are the same wireless signal simultaneously transmitted in phase from the wireless base station 131 to the repeater wireless stations. Instead of the wireless base station 131 applying the phase shifts to the wireless signals at the wireless base station 131, the repeater wireless stations apply appropriate phase adjustments to the received wireless signals based on respective distances D11, D12, D21, D22, D31 and D32 such that the communication device CD2 receives the wireless signals A1', A2', and A3' in phase with each other.

In still further embodiments, the wireless base station 131 or other suitable entity adjusts the phase (time delay) of each transmitted wireless signal A1', A2', and A3' based on respective distances D11, D12, D21, D22, D31 and D32. The different phase adjustments (time delays) applied to the transmitted wireless signals A1, A2, and A3 ensures that the communication device CD2 receives the repeated wireless signals A1', A2', and A3' in phase with respect to each other.

In one embodiment, the communication management resource 141 associated with the wireless base station 131 determines a time of flight based on a distance between each of the wireless stations such as based on the location information indicating locations of the wireless stations. The phase adjustment (time delay) applied to signal A1 at the wireless base station 131 is dependent on a total time of flight associated with distance D11+D12; the phase adjustment applied to signal A2 at the wireless base station 131 is dependent on a total time of flight associated with distance D21+D22; phase adjustment applied to signal A3 at the wireless base station 131 is dependent on a total time of flight associated with distance D31+D32.

Thus, in one embodiment, the wireless base station 131 communicates signals A1, A2, and A3 (with different determined phase delays based on total path distances D11+D12, D21+D22, D31+D32) such that the communication device CD2 receives the different instances of the signal A in phase with respect to each other.

As further discussed herein, phase alignment and constructive interference of the second wireless signals A1', A2', and A3' as received by the mobile communication device CD2 provide a strong wireless signal for processing by the mobile communication device CD2, reducing a likelihood of communication failures and supporting increased wireless data rates (lower rate of lost data).

Note further that the communication device CD2 can be configured to implement different antenna elements to receive the different wireless signals A1', A2' and A3'. The communication device CD2 can be configured to adjust the received signals as needed to ensure proper phase alignment.

Examples of receiving and repeating wireless signals from repeater wireless stations to provide better signal strength to a target communication device are further discussed below.

Figure 2:
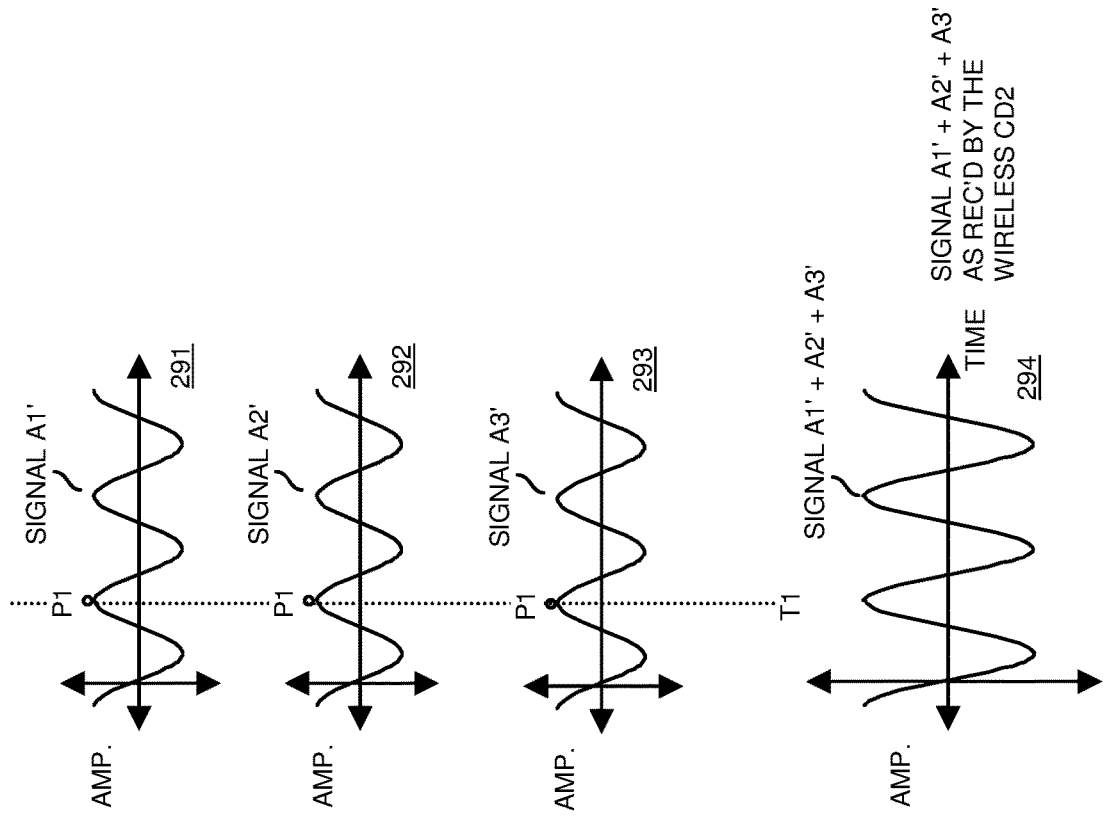
FIG. 2 is an example diagram illustrating in-phase reception of wireless signals at multiple repeater wireless stations and retransmission of the wireless signals with phase adjustments (time delays) according to embodiments herein.
Figure 2:
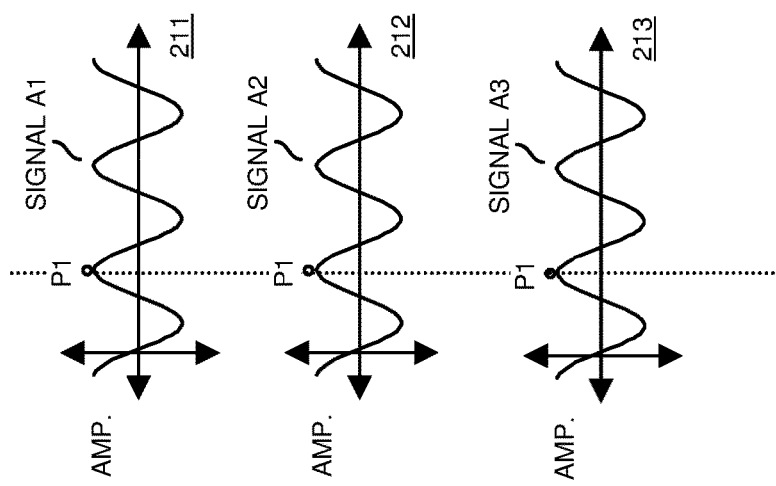

FIG. 2 is an example diagram illustrating in-phase reception of wireless signals at multiple repeater wireless stations and retransmission with phase adjustments according to embodiments herein.

In this example embodiment, the wireless base station 131 applies time delays to the signals A1, A2, and A3 such that they are received at the repeater wireless stations at the same time. The graph 211 illustrates a timing of the repeater wireless station 151 receiving the wireless signal A1 from the wireless base station 131; the graph 212 illustrates a timing of the repeater wireless station 152 receiving the wireless signal A2 from the wireless base station 131; the graph 213 illustrates a timing of the repeater wireless station 153 receiving the wireless signal A3 from the wireless base station 131. The wireless base station 131 delays each signal such that the repeater wireless stations receive the signal in-phase with respect to each other.

More specifically, as previously discussed, the wireless base station 131 implements different time delays based on distances D11, D12, and D13 to communicate the signals A1, A2, and A3 to the repeater wireless stations.

For example, assume that the distance D11<D12<D13. Wireless base station 131 transmits wireless signal A3 first in time because D13 is the longest distance for the wireless signal A3 to travel; wireless base station 131 transmits wireless signal A2 time delayed with respect to wireless signal A3 based on a time delay TD23=[D13−D12]/S, where S is a speed (distance per time) of the wireless signal traveling through air from the wireless base station 131 to the repeater wireless stations; wireless base station 131 transmits wireless signal A1 time delayed with respect to wireless signal A3 based on a time delay TD13=[D13−D11]/S, where S is a speed of the wireless signal traveling through air from the wireless base station 131 to the repeater wireless station.

As shown in timing diagrams 211, 212, and 213, implementation of time delays at the wireless base station 131 results in each of the repeater wireless stations 151, 152, and 153 receiving the different instances of signal A (such as wireless signal A1', A2', and A3') in-phase with respect to each other.

As previously discussed, each of the repeater wireless stations can be configured to receive time delay information (such as from the wireless base station 131 or other suitable entity) indicating how to delay transmission of wireless signals further transmitted from the repeater wireless stations to the communication device CD2. Additionally, or alternatively, each of the repeater wireless stations can be configured to determine an appropriate time delay to apply to respective wireless signals A1, A2, and A3 based on knowing distances D21, D22, and D23.

In one embodiment, each of the repeater wireless stations 151, 152, and 153 are synchronized with respect to a same master clock. This ensures the synchronicity of the time delays implemented by the repeater wireless stations.

For example, assume that the distance D21<D22<D23. In accordance with phase adjustment information, the repeater wireless station transmits wireless signal A3' first in time because it is the longest distance to the communication device CD2; wireless base station 131 transmits wireless signal A2' time delayed with respect to wireless signal A3' based on a time delay TD23'=[D23−D22]/S, where S is a speed of the wireless signal traveling through air from the repeater wireless station 153 to the communication device CD2; repeater wireless station 153 transmits wireless signal A1' time delayed with respect to wireless signal A3' based on a time delay TD13'=[D23−D21]/S, where S is a speed of the wireless signal traveling through air from the repeater wireless station to the communication device CD2.

In this example embodiment, the graph 291 illustrates a timing of the communication device CD2 receiving the wireless signal A1' from the repeater wireless station 151; the graph 292 illustrates a timing of the communication device CD2 receiving the wireless signal A2' from the repeater wireless station 152; the graph 293 illustrates a timing of the communication device CD2 receiving the wireless signal A3' from the repeater wireless station 153.

Graph 294 illustrates a combination or summation of received wireless signals A1', A2', and A3' processed by the communication device CD2 to retrieve a respective data payload communicated in the wireless signal A to the mobile communication device CD2.

Note that the time delays as discussed herein can be greater than a single period (1/frequency of the wireless signal A). For example, the time delay as discussed herein can include any number of periods of the instance of wireless signal A being transmitted or retransmitted.

Figure 3:
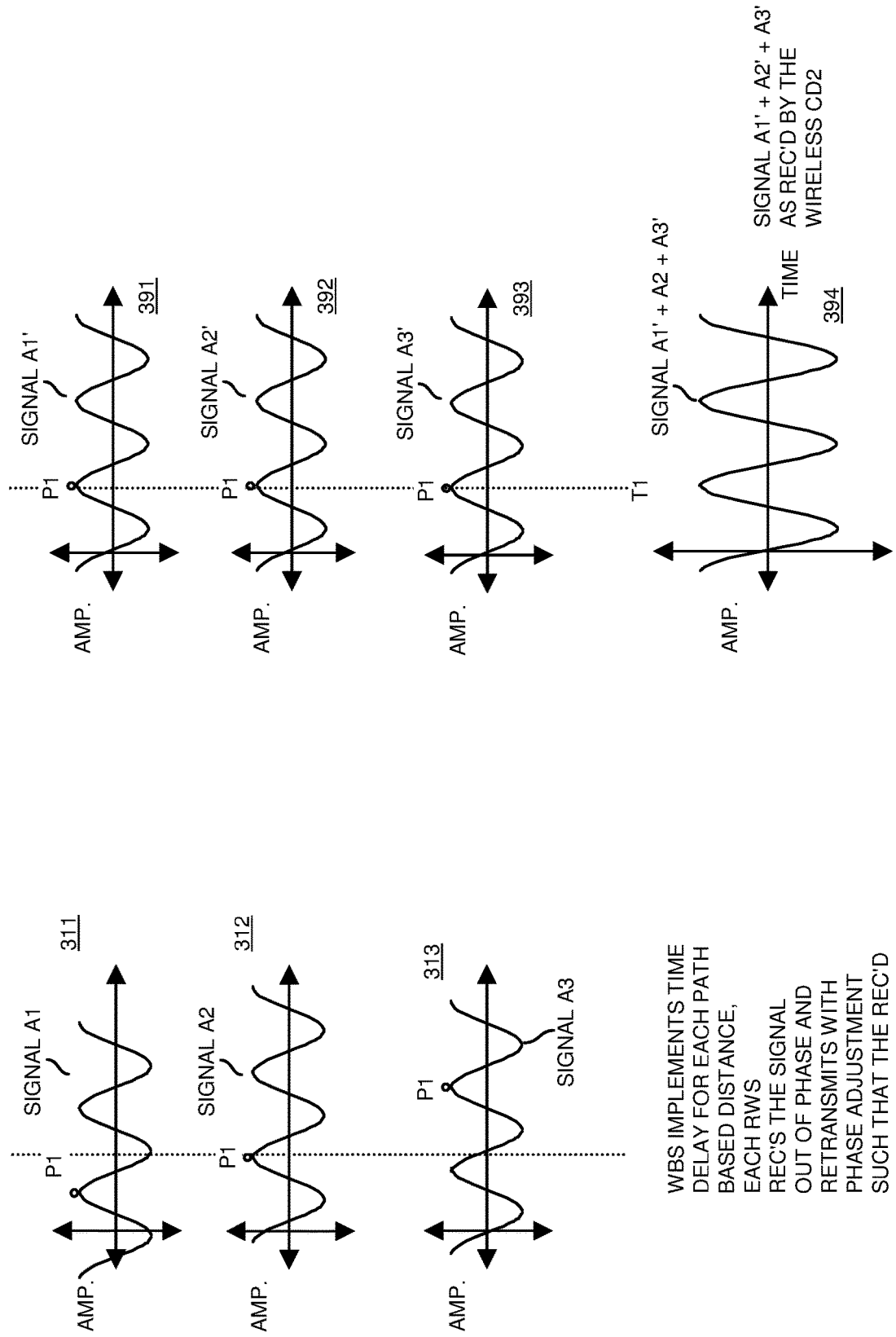
FIG. 3 is an example diagram illustrating out-of-phase reception of wireless signals at multiple repeater wireless stations and retransmission of the wireless signals with or without phase adjustments according to embodiments herein.

FIG. 3 is an example diagram illustrating out-of-phase reception of wireless signals at multiple repeater wireless stations and retransmission without phase adjustments according to embodiments herein.

In this example embodiment, the graph 311 illustrates a timing of the repeater wireless station 151 receiving the wireless signal A1 from the wireless base station 131; the graph 312 illustrates a timing of the repeater wireless station 152 receiving the wireless signal A2 from the wireless base station 131; the graph 313 illustrates a timing of the repeater wireless station 153 receiving the wireless signal A3 from the wireless base station 131. The wireless base station 131 transmits each instance of signal A such that the repeater wireless stations receive the signal out of phase with respect to each other.

In one embodiment, the time delays implemented by the wireless base station 131 are based on the full time of flight delay between the wireless base station 131 and the communication device CD2. In such an instance, the repeater wireless stations need not implement any time delays because the wireless base station 131 delays the signals A1, A2, and A3 such that the repeated wireless signals A1', A2', and A3' arrive at the communication device CD2 in phase with respect to each other.

More specifically, as previously discussed, the wireless base station 131 can be configured to implement different time delays based on distances D11+D21, D12+D22, and D13+D23 to communicate the signals A1, A2, and A3 through the repeater wireless stations to the communication device CD2.

For example, assume that the distance D11+D12<D12+D22<D13+D23. Wireless base station 131 transmits wireless signal A3 first in time because D13+D23 is the longest distance for a combination of the wireless signal A3 and A3' to travel; wireless base station 131 transmits wireless signal A2 time delayed with respect to wireless signal A3 based on a time delay TD23=[(D13+D23)−(D12+D22)]/S, where S is a speed of the wireless signal traveling through air from the wireless base station 131 to the repeater wireless stations; wireless base station 131 transmits wireless signal A1 time delayed with respect to wireless signal A3 based on a time delay TD13=[(D13+D23)−(D11+D21)]/S, where S is a speed of the wireless signal traveling through air from the wireless base station 131 to the repeater wireless station.

As shown in timing diagrams 211, 212, and 213, implementation of time delays at the wireless base station 131 results in each of the repeater wireless stations 151, 152, and 153 receiving the different instances of signal A out of phase with respect to each other.

In this example embodiment, however, the graph 391 illustrates a timing of the communication device CD2 receiving the wireless signal A1' from the repeater wireless station 151; the graph 392 illustrates a timing of the communication device CD2 receiving the wireless signal A2' from the repeater wireless station 152; the graph 393 illustrates a timing of the communication device CD2 receiving the wireless signal A3' from the repeater wireless station 153. The communication device CD2 receives the signals A1', A2', and A3' in phase with respect to each other.

Graph 394 illustrates a combination or summation of received wireless signals A1', A2', and A3' processed by the communication device CD2 to retrieve a respective data payload communicated in the wireless signal A to the mobile communication device CD2.

Figure 4:
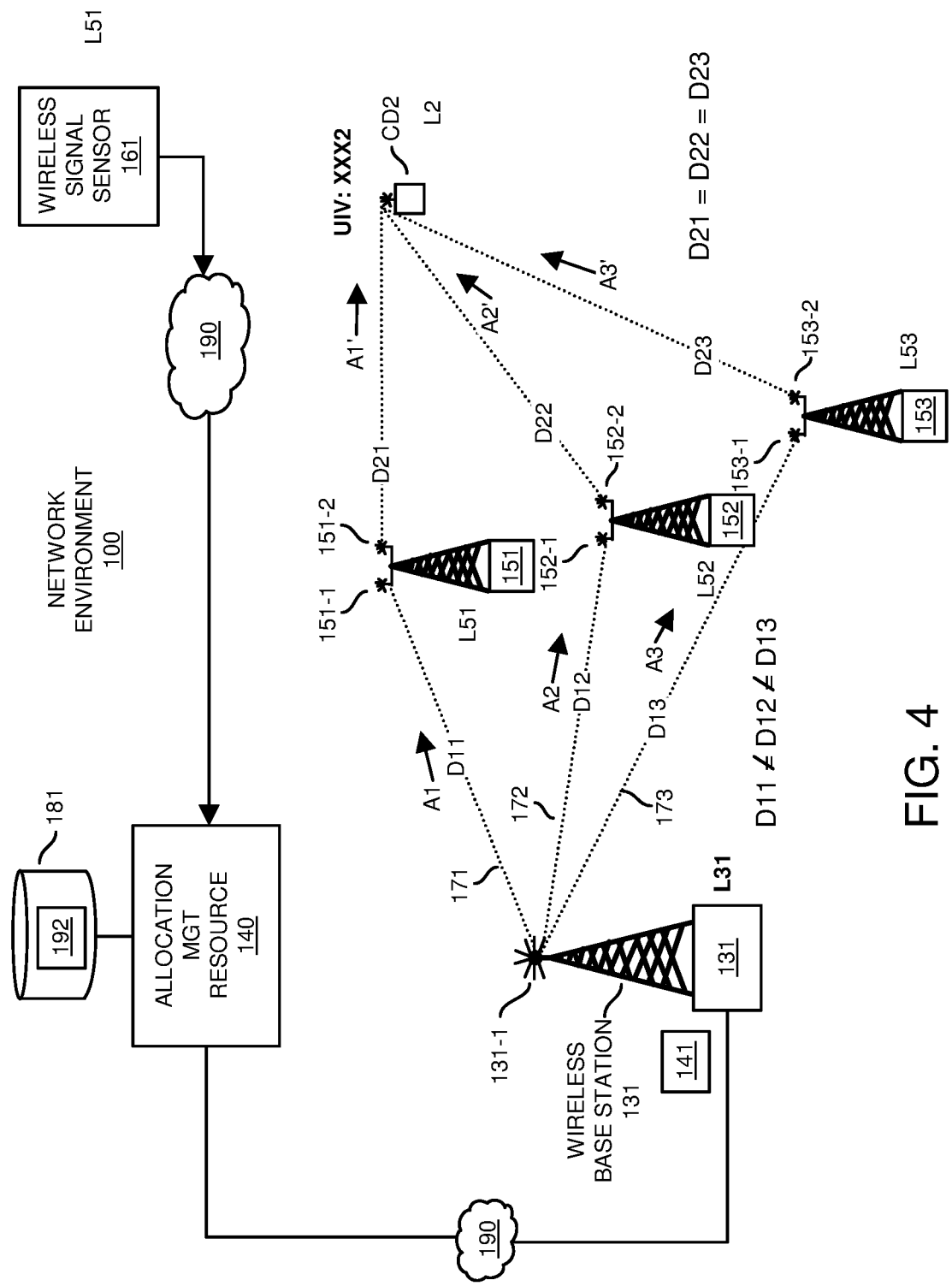
FIG. 4 is an example diagram illustrating a communication network environment and multiple wireless base stations implementing wireless connectivity according to embodiments herein.

FIG. 4 is an example diagram illustrating a communication network environment and multiple wireless base stations implementing wireless connectivity according to embodiments herein.

In this example embodiment, the distances D11<D12<D13. The distances D21, D22, and D23 are equal (e.g., D21=D22=D23). There is no need to apply time delays to the signals A1', A2', and A3' because D21=D22=D23.

Figure 5:
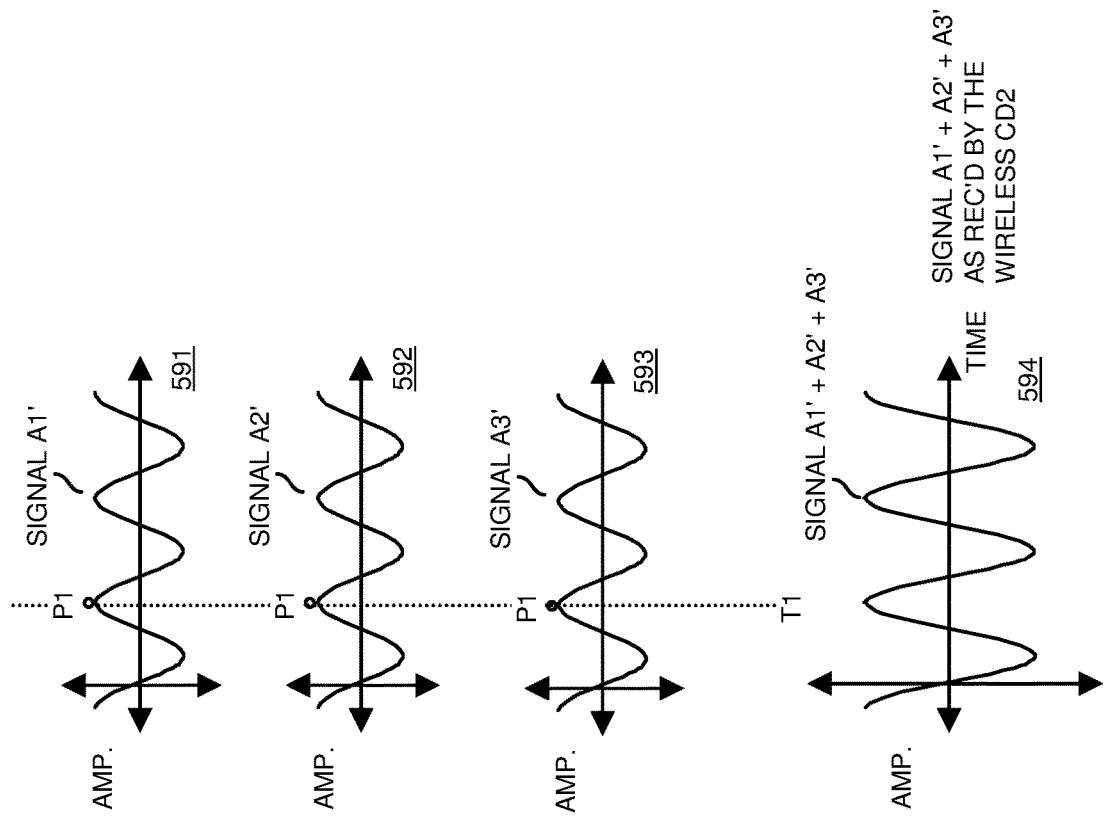
FIG. 5 is an example diagram illustrating in-phase reception of wireless signals at multiple repeater wireless stations and retransmission with phase adjustments according to embodiments herein.
Figure 5:
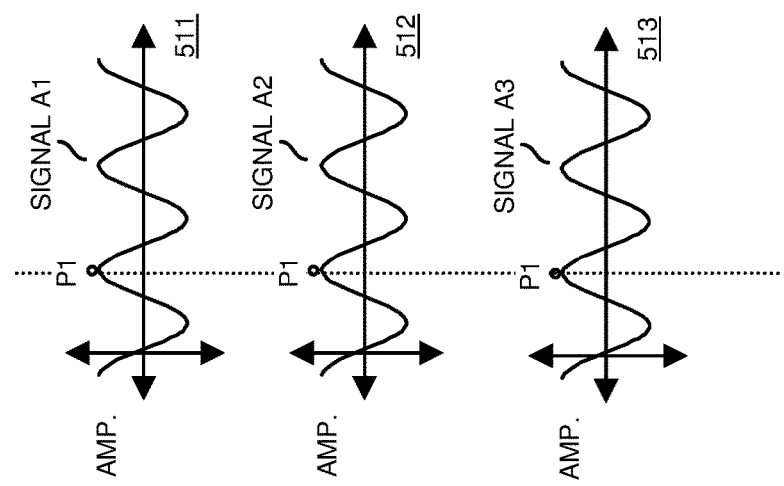

FIG. 5 is an example diagram illustrating in-phase reception of wireless signals at multiple repeater wireless stations and retransmission without phase adjustments according to embodiments herein.

More specifically, as previously discussed, the wireless base station 131 implements different time delays based on distances D11, D12, and D13 to communicate the signals A1, A2, and A3 to the repeater wireless stations.

For example, assume that the distance D11<D12<D13. Wireless base station 131 transmits wireless signal A3 first in time because D13 is the longest distance for the wireless signal A3 to travel; wireless base station 131 transmits wireless signal A2 time delayed with respect to wireless signal A3 based on a time delay TD23=[D13−D12]/S, where S is a speed of the wireless signal traveling through air from the wireless base station 131 to the repeater wireless stations; wireless base station 131 transmits wireless signal A1 time delayed with respect to wireless signal A3 based on a time delay TD13=[D13−D11]/S, where S is a speed of the wireless signal traveling through air from the wireless base station 131 to the repeater wireless station.

As shown in timing diagrams 211, 212, and 213, implementation of time delays at the wireless base station 131 results in each of the repeater wireless stations 151, 152, and 153 receiving the different instances of signal A in-phase with respect to each other.

Each of the repeater wireless stations repeats the received wireless station without a respective time delay because the distances D21, D22, and D23 are equal. For example, repeater wireless station 151 repeats wireless signal A1 as wireless signal A1' without a time delay; repeater wireless station 152 repeats wireless signal A2 as wireless signal A2' without a time delay; repeater wireless station 153 repeats wireless signal A3 wireless signal A3' without a time delay.

In this example embodiment, the graph 591 illustrates a timing of the communication device CD2 receiving the wireless signal A1' from the repeater wireless station 151; the graph 592 illustrates a timing of the communication device CD2 receiving the wireless signal A2' from the repeater wireless station 152; the graph 593 illustrates a timing of the communication device CD2 receiving the wireless signal A3' from the repeater wireless station 153.

Graph 594 illustrates a combination or summation of received wireless signals A1', A2', and A3' processed by the communication device CD2 to retrieve a respective data payload communicated in the wireless signal A to the mobile communication device CD2.

As previously discussed, note that the time delays as discussed herein can be greater than a single period (1/frequency of the wireless signal A). For example, the time delay as discussed herein can include any number of periods of the wireless signal A.

Figure 6:
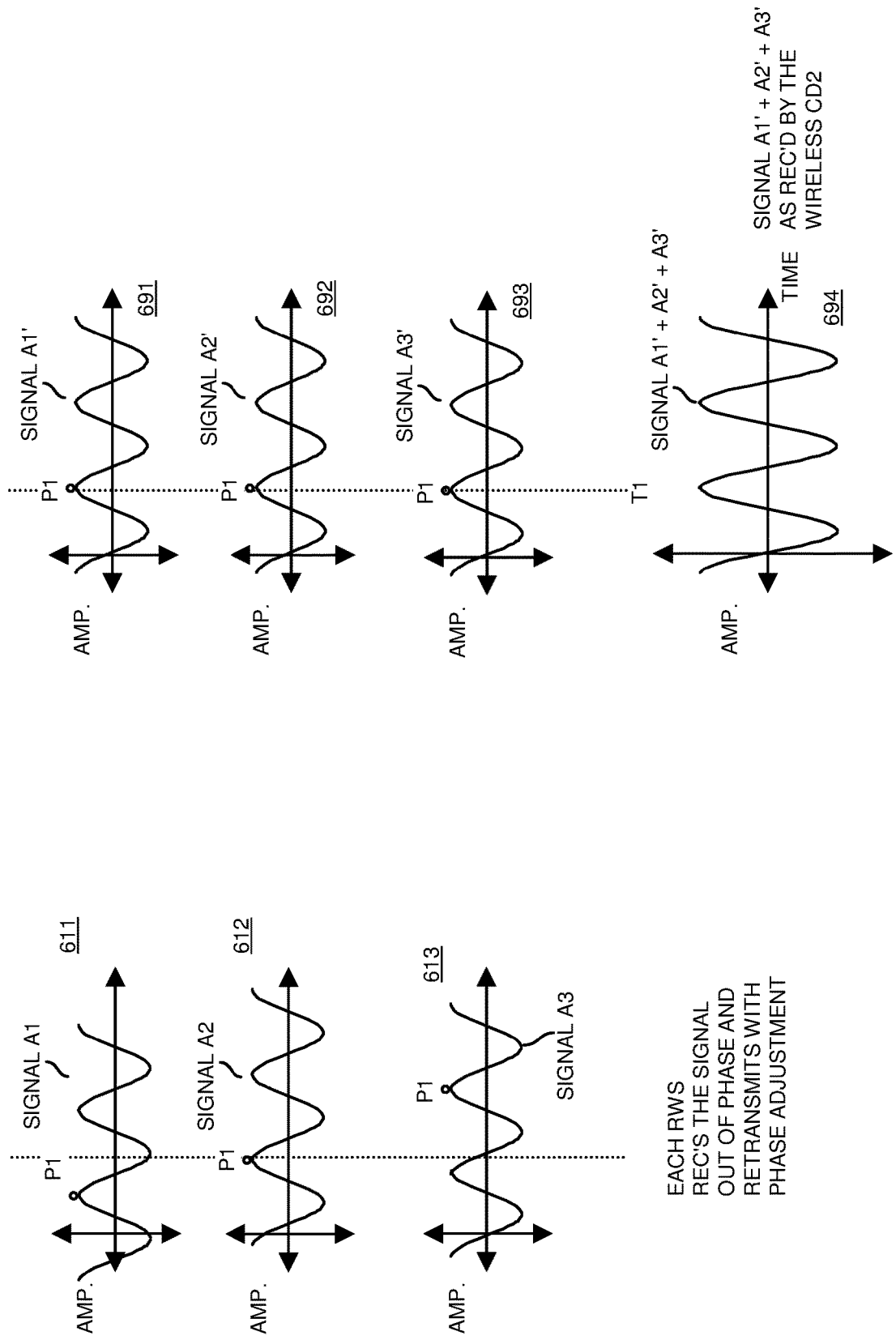
FIG. 6 is an example diagram illustrating out-of-phase reception of wireless signals at multiple repeater wireless stations and retransmission with or without phase adjustments according to embodiments herein.

FIG. 6 is an example diagram illustrating out-of-phase reception of wireless signals at multiple repeater wireless stations and retransmission with phase adjustments according to embodiments herein.

In this example embodiment, the wireless base station 131 simultaneously transmits the wireless signal A1, A2, and A3. This results in the repeater wireless stations receiving the signals out of phase with respect to each other. The graph 311 illustrates a timing of the repeater wireless station 151 receiving the wireless signal A1 from the wireless base station 131; the graph 312 illustrates a timing of the repeater wireless station 152 receiving the wireless signal A2 from the wireless base station 131; the graph 313 illustrates a timing of the repeater wireless station 153 receiving the wireless signal A3 from the wireless base station 131.

In this example embodiment, each of the repeater wireless stations implements an appropriate phase adjustment to received signals A1, A2, and A3 such that the mobile communication device CD2 receives each of the wireless signals A1', A2', and A3'.

Figure 7:
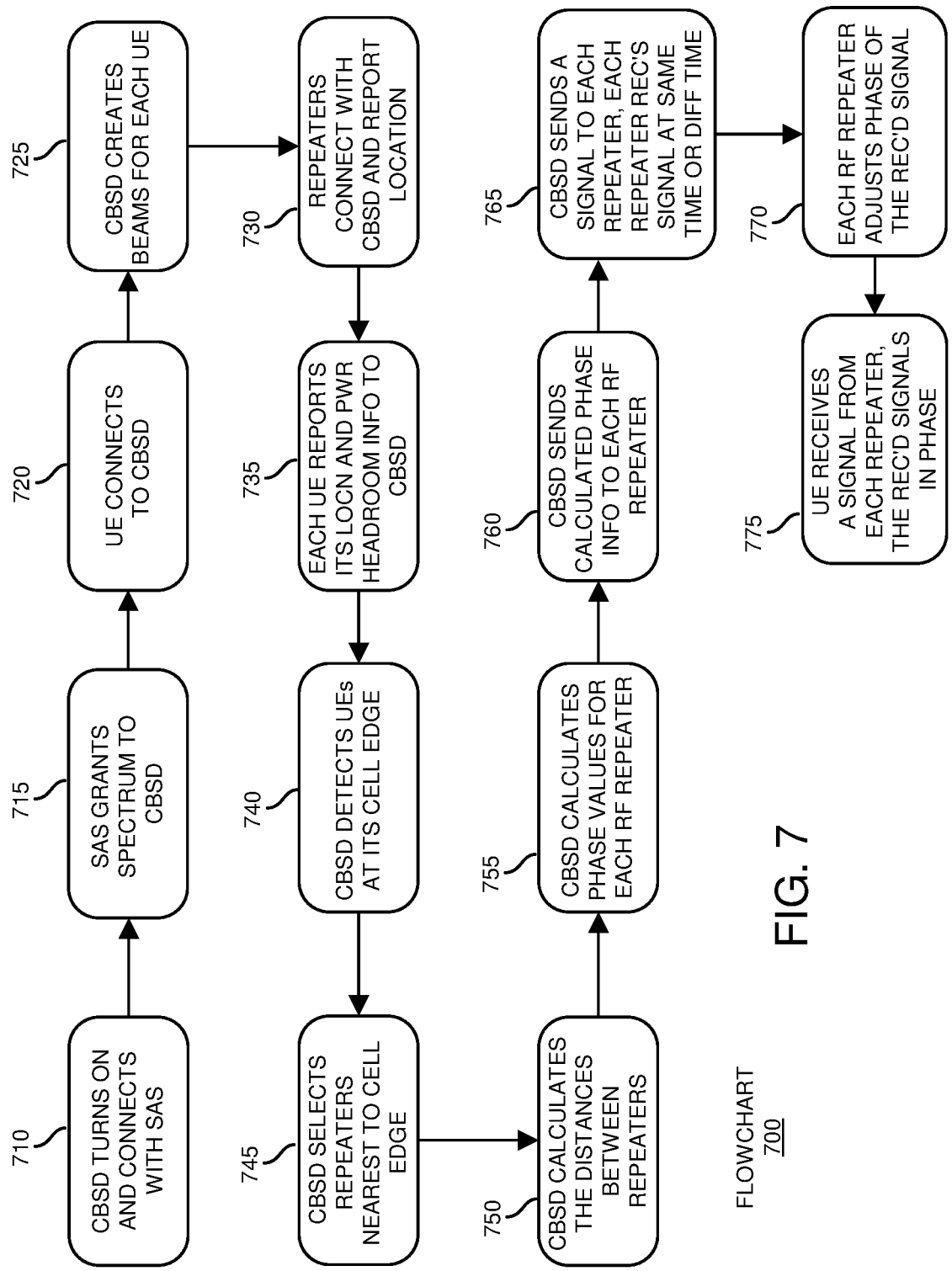
FIG. 7 is an example diagram illustrating operations according to embodiments herein.

FIG. 7 is an example diagram illustrating operations according to embodiments herein.

In processing operation 710, the wireless base station 310 registers with the allocation management resource 140 for use of one or more wireless channels.

In processing operation 715, the allocation management resource 140 grants one or more wireless channels to the wireless base station 131 to support wireless communications in network environment 100.

In processing operation 720, the communication device CD2 establishes a respective wireless communication link with the wireless base station 131.

In processing operation 725, the wireless base station 131 creates different beams 171, 172, and 173 for communication device CD2 in wireless network environment 100.

In processing operation 730, each of the repeater wireless stations 151, 152, and 153 establishes wireless connectivity with the wireless base station 131. In one embodiment, each of the repeater wireless stations communicate their respective location to the wireless base station 131. For example, the repeater wireless station 151 notifies the wireless base station 131 that it (repeater wireless station 151) resides at location L51; the repeater wireless station 152 notifies the wireless base station 131 that it (repeater wireless station 152) resides at location L52; the repeater wireless station 153 notifies the wireless base station 131 that it (repeater wireless station 153) resides at location L53; and so on. Additionally, or alternatively, the repeater wireless stations reside at fixed locations known to the wireless base station 131 based on installation information received from an entity tracking respective locations of the repeater wireless stations.

In processing operation 735, each of the instances of user equipment (mobile communication devices) reports its location and/or corresponding power headroom information to the wireless base station 131. In one embodiment, the power headroom information indicates a respective wireless level at which the mobile communication device receives wireless communications from the wireless base station 131. Such information can be used to determine if the respective mobile communication device resides at an edge of a respective wireless cell associated with the wireless base station 131. For example, if the communication device CD2 at location L2 is only able to receive wireless communications from the wireless base station at a very low power wireless level, it is known that the communication device CD2 is located at the edge of the region of wireless coverage provided by the wireless base station 131. In such an instance, the implementation of one or more repeater wireless stations are good candidates in which to provide the communication device CD2 wireless connectivity to the wireless base station 131.

In processing operation 740, the wireless base station 131 uses the received information associated with the communication device CD2 to determine that it resides on a respective cell edge, most likely meaning that the wireless base station 131 provides poor wireless bandwidth connectivity to the communication device CD2.

In processing operation 745, the wireless base station 131 selects a group of multiple repeater wireless stations nearest the cell edge and/or communication device CD2 to collectively provide the communication device CD2 access to the remote network 190 (such as Internet or other one or more networks).

In processing operation 755, the wireless base station 131 calculates phase values for each repeater wireless station such that the communication device CD2 receives the instances of replicated signal A in phase with respect to each other.

In processing operation 760, the wireless base station communicates the calculated phase information to each of the repeater wireless stations. Alternatively, the wireless base station 121 uses the calculated phase information to control transmission of the different replicated signals.

In processing operation 765, the wireless base station 131 transmits a respective instance of signal A to each of the repeater wireless stations over different beams 171, 172, and 173. Each repeater wireless station receives the signal A in phase or out of phase with respect to each other.

In processing operation 770, each repeater wireless station phase adjusts its transmission of the received wireless signal in a manner as specified by the calculated phase information.

In processing operation 775, the communication device CD2 receives an instance of the signal A from each of the repeater wireless stations. Based on the phase adjustments applied by one or more of the wireless base station 131, repeater wireless stations, etc., the communication device CD 2 receives the multiple instances of the signal A substantially in phase with respect to each other.

Figure 8:
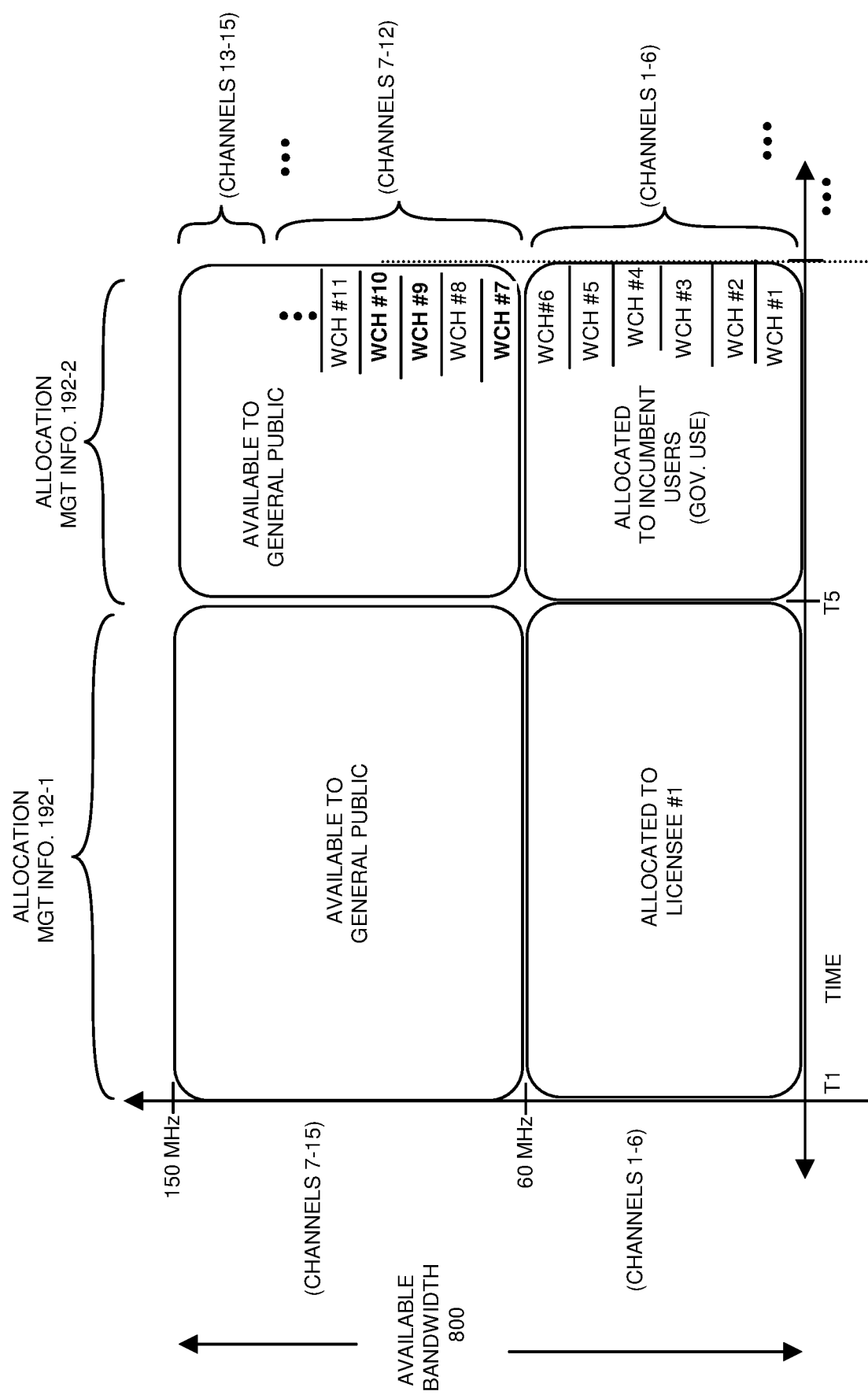
FIG. 8 is an example diagram illustrating a wireless spectrum from which wireless channels are allocated and deallocated according to embodiments herein.

FIG. 8 is an example diagram illustrating generation of dynamic channel allocation information indicating allocation of bandwidth at different tiers of a channel hierarchy according to embodiments herein.

As previously discussed, communication management resource 140 can be configured to allocate any suitable type of wireless spectrum (bandwidth, wireless channels, etc.) for use by the communication devices such as wireless base stations, customer premises equipment, etc., in the network environment 100.

In one non-limiting example embodiment, the communication management resource 140 allocates bandwidth (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, allocation management resource 140 (such as spectrum access system or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use.

More specifically, in this example, the allocation management information 192-1 (a first instance of allocation management information) indicates that between time T1 and time T5, channels 7-15 are available to the general authorized access users (general public or low priority users) for use; channels 1-6 are available for use by licensee #1. In a manner as previously discussed, these channels are allocated for use by the wireless base stations in network environment 100.

As further shown, at or around time T5, assume that the communication management resource 140 receives input indicating use of a portion (channels 1-6) of the spectrum by an incumbent user such as the government. In such an instance, the allocation management resource 140 updates the channel allocation information such that the allocation management information 192-2 indicates that only channels 7-15 are allocated as being available to the general authorized access users; channels 1-6 are assigned for use by an incumbent entity requesting use or actually using the channels. Thus, after time T5, the wireless channels 1-6 are no longer available for use by the licensee #1.

In one embodiment, in response to revocation of the allocation of wireless channels 1-6 (or any portion thereof), the communication management resource 140 notifies the wireless base station 131 at or around time T5 that the wireless base station 131 is no longer able to use wireless channel #1 because these channels have been revoked and are used by the incumbent user.

Thus, between time T1 and time T5, the wireless base station 131 and corresponding repeater wireless stations use the wireless channel #1 to provide wireless service to the communication devices. At or around time T5, the communication management resource 140 deallocates use of the wireless channel #1 from the wireless base station 131.

This illustrates the dynamic availability of different wireless channels bandwidth in a hierarchy as shared in network environment 100. For example, if communication management resource 140 allocates use of wireless channels #1-6 in the hierarchy of available channels to any of one or more base stations, communication devices, etc., then the communication management resource 140 must de-allocate use of such wireless channels during conditions in which a higher priority so-called incumbent user relinquishes use of wireless channels 1-6 at or around time T5. In such an instance, as previously discussed, the communication management resource 140 deallocates the wireless channels 1-6 from respective wireless stations for use instead by the incumbent user (higher priority user).

In this example embodiment as previously discussed, the allocation management resource 140 can be configured to allocate use of wireless channel WCH #1 to wireless base station 131 and the repeater wireless stations. In response to detecting a condition that a respective one or more incumbent entity uses the respective wireless channels, the allocation management resource 140 communicates with the wireless base stations to revoke use of such wireless channel. If available, the allocation management resource 140 allocates use of different wireless channels to the wireless base stations. Subsequent to the incumbent entity discontinuing use of the wireless channel #1, the allocation management resource 140 allocates the wireless channel #1 to the wireless base station 13 and corresponding repeater wireless stations.

Figure 9:
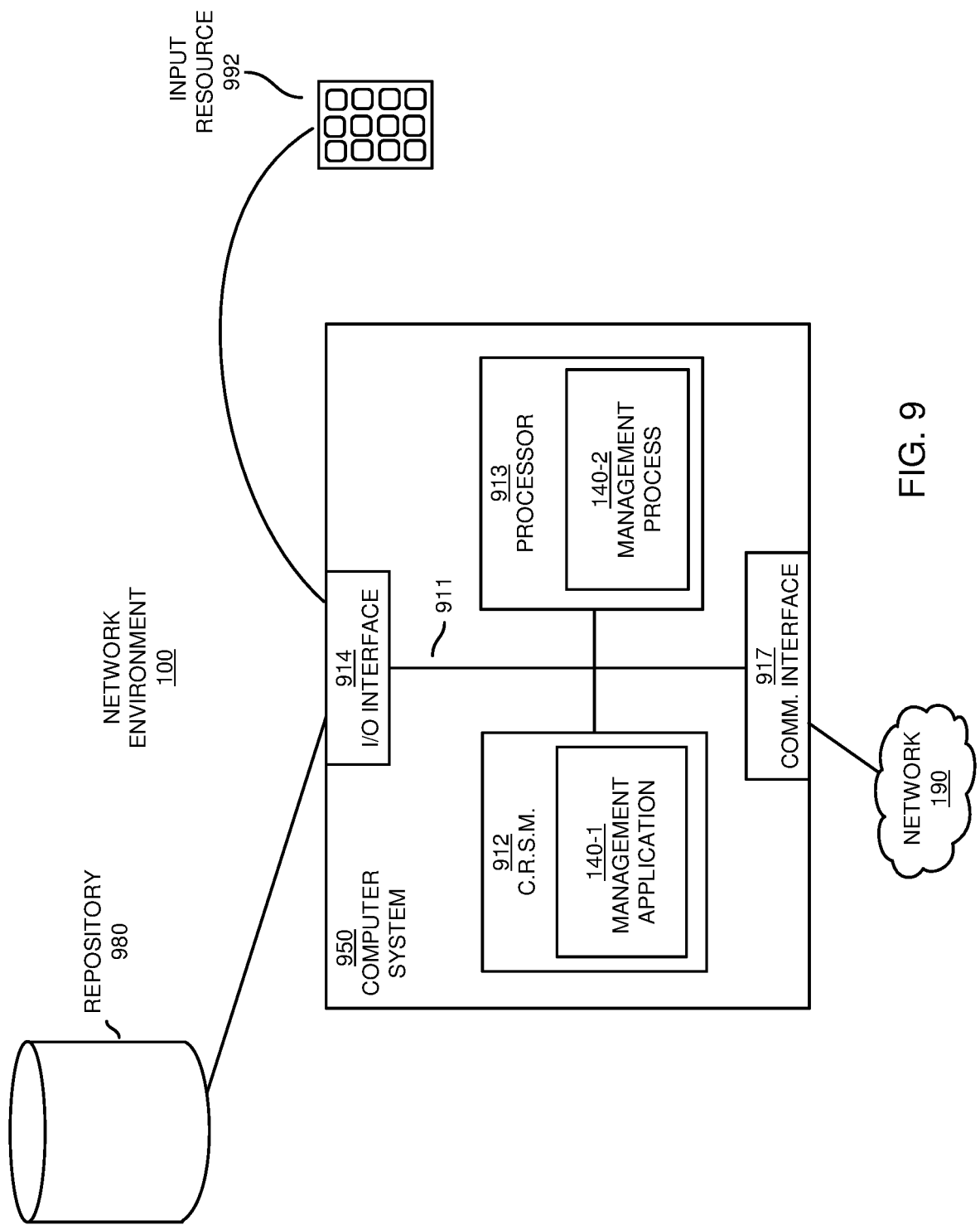
FIG. 9 is an example diagram illustrating example computer architecture operable to execute one or more operations according to embodiments herein.

FIG. 9 is an example block diagram of a computer system for implementing any of the operations as discussed herein according to embodiments herein.

Any of the resources (such as allocation management resource 140, wireless base station 131, repeater wireless station 151, repeater wireless station 152, repeater wireless station 153, communication device CD2, etc.) as discussed herein can be configured to include a respective instantiation of computer processor hardware and corresponding executable instructions to carry out the different operations as discussed herein. For example, communication management resource 141 (such as associated with one or more of the wireless base station, repeater wireless stations, communication device, etc.) can be configured to execute the (communication) management application 141-1 to execute operations associated with the communication management resource 141.

As further shown, computer system 950 of the present example includes an interconnect 911 that couples computer readable storage media 912 such as a non-transitory type of media (i.e., any type of hardware storage medium) from which digital information is stored and retrieved, a processor 913, I/O interface 914, and a communications interface 917.

I/O interface 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 141-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 141-1 stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to communication management application 141-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 9. Note that the steps in the flowcharts below can be executed in any suitable order.

Figure 10:
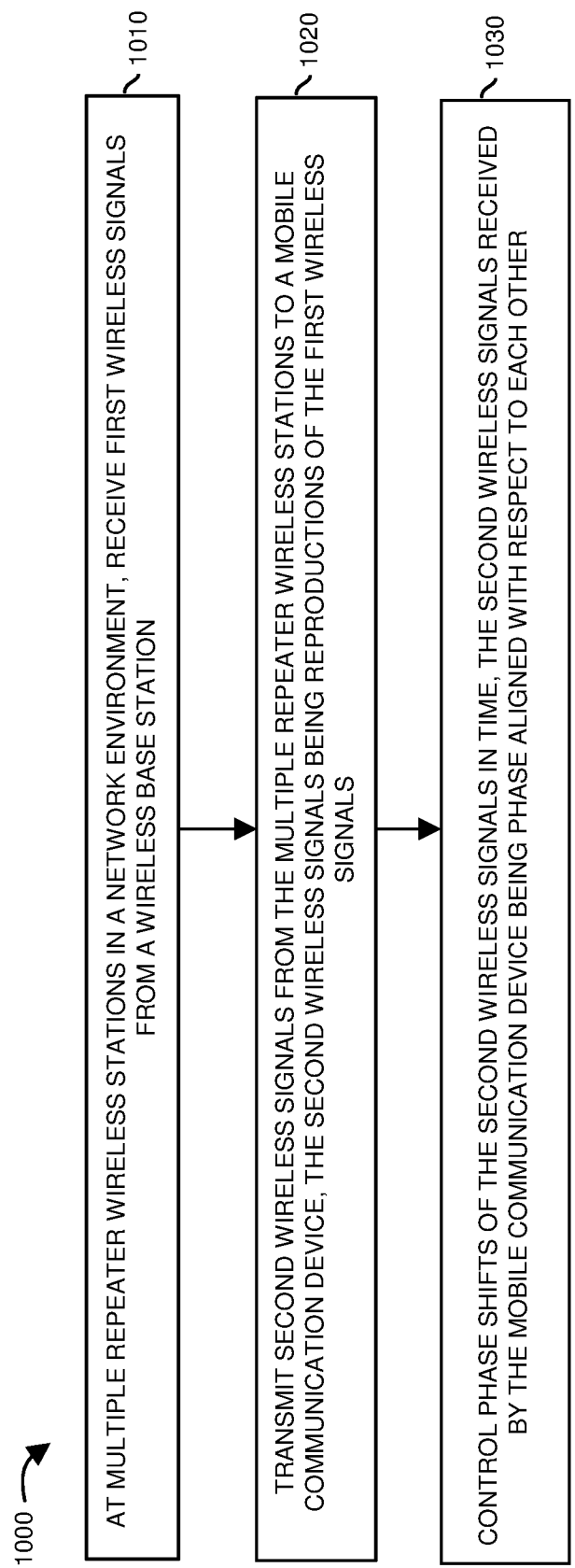
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the multiple repeater wireless stations 151, 152, and 153 in network environment 100 receive first wireless signals A1, A2, and A3 from the wireless base station 131.

In processing operation 1020, the repeater wireless stations 151, 152, and 153 transmit second wireless signals A1', A2', and A3' from the multiple repeater wireless stations to a mobile communication device CD2. As previously discussed, the second wireless signals A1, A2, and A3 are reproductions of the first wireless signals A1', A2', and A3'.

In processing operation 1030, a communication management resource 141 (such as a controller located in one or more of the wireless base station 131, repeater wireless stations 151, 152, and 153) controls phase shifts of the second wireless signals A1', A2'. and A3' in time such that the phase shifted (adjusted) second wireless signals are received by the mobile communication device as being phase aligned with respect to each other.

Note again that techniques herein are well suited to support more robust and efficient communications in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   operating a set of multiple repeater wireless stations to receive first wireless signals from a wireless base station;
   transmitting second wireless signals from the multiple repeater wireless stations to a mobile communication device, the second wireless signals being reproductions of the first wireless signals; and
   controlling phase shifts of the second wireless signals in time, the phase shifted second wireless signals received by the mobile communication device being phase aligned with respect to each other.

2. The method as in claim 1 further comprising:
   controlling a magnitude of the phase shifts of the second wireless signals based on: i) first time of flight distances between the wireless base station and the multiple repeater wireless stations, and ii) second time of flight distances between the multiple repeater wireless stations and the mobile communication device.

3. The method as in claim 1 further comprising:
receiving first location information indicating locations of each of the multiple repeater wireless stations;
determining first time of flight distances between the wireless base station and the multiple repeater wireless stations based on the first location information; and
controlling the phase shifts of the second wireless signals in time with respect to the first wireless signals based at least in part on the first time of flight information.

4. The method as in claim 3 further comprising:
receiving second location information indicating a location of the mobile communication device;
determining second time of flight distances between the multiple repeater wireless stations and the mobile communication device; and
controlling the phase shifts of the second wireless signals in time with respect to the first wireless signals based on the second time of flight information.

5. The method as in claim 1, wherein controlling the phase shifts includes:
communicating phase shift information from the wireless base station to the multiple repeater wireless stations, the multiple repeater wireless stations implementing phase shifts as specified by the phase shift information.

6. The method as in claim 1 further comprising:
implementing the phase shifts at the wireless base station via phase shifting of the first wireless signals transmitted to the multiple repeater wireless stations.

7. The method as in claim 1, wherein the second wireless signals received by the mobile communication device are substantially in phase with each other.

8. The method as in claim 1 further comprising:
determining the phase shifts based at least in part on distances between the multiple repeater wireless stations.

9. The method as in claim 1 further comprising:
controlling transmission of the first wireless signals from the wireless base station such that the first wireless signals received by the multiple repeater wireless stations are substantially in phase with each other.

10. The method as in claim 1 further comprising:
registering the wireless base station with an allocation management resource for allocation of a wireless channel in which to transmit the first wireless signals and the second wireless signals.

11. The method as in claim 1, wherein the first wireless signals include: i) a first signal wirelessly received at a first repeater wireless station of the multiple repeater wireless stations, and ii) a second signal wirelessly received at a second repeater wireless station of the multiple repeater wireless stations; and
wherein the second wireless signals include: i) a third signal wirelessly transmitted from the first repeater wireless station, and ii) a fourth signal wirelessly transmitted from the second repeater wireless station.

12. The method as in claim 11, wherein the third signal is a replica of the wirelessly received first signal; and
wherein the fourth signal is a replica of the wirelessly received second signal.

13. The method as in claim 12, wherein the second signal is a replica of the first signal; and
wherein the first signal and the second signal are simultaneously transmitted from the wireless base station, the first signal and the second signal being phase aligned with each other.

14. The method as in claim 13, wherein the third signal transmitted from the first repeater wireless station is out of phase with respect to the fourth signal transmitted from the second repeater wireless station.

15. The method as in claim 14, wherein the third signal and the fourth signal received at the mobile communication device are phase aligned with respect to each other.

16. The method as in claim 1, wherein the second wireless signals include a first wireless signal and a second wireless signal, the first wireless signal transmitted from a first repeater wireless station of the multiple repeater wireless stations, the second wireless signal transmitted from a second repeater wireless station of the multiple repeater wireless stations; and
wherein the first wireless signal and the second wireless signal received at the mobile communication device are phase aligned with each other based on a variation in a first distance between the mobile communication device and the first repeater wireless station and a second distance between the mobile communication device and the second repeater wireless station.

17. The method as in claim 1 further comprising:
controlling the phase shifts of the second wireless signals based on: i) a first distance between the wireless base station and a first repeater wireless station of the multiple repeater wireless stations, and ii) a second distance between the wireless base station and a second repeater wireless station of the multiple repeater wireless stations; and
wherein the second distance is different than the first distance.

18. The method as in claim 1, wherein the multiple repeater wireless stations include a first repeater wireless station and a second repeater wireless station;
wherein the second wireless signals include: i) a first wireless signal transmitted from the first repeater wireless station to the mobile communication device, the first wireless signal including a first peak, and ii) a second wireless signal transmitted from the second repeater wireless station to the mobile communication device, the second wireless signal including a second peak;
wherein the second wireless signal is a replica of the first wireless signal, the second peak being a replica of the first peak; and
wherein the mobile communication device is operative to simultaneously receive the first peak of the first wireless signal and the second peak of the second wireless signal based on the controlled phase shifts of the second wireless signals.

19. The method as in claim 1 further comprising:
determining the phase shifts in which to control transmission of the second wireless signals from the multiple repeater wireless stations based at least in part on a first distance between a first repeater wireless station of the multiple repeater wireless stations and the mobile communication device and a second distance between a second repeater wireless station of the multiple repeater wireless stations and the mobile communication device.

20. A system comprising:
a set of multiple repeater wireless stations operative to:
receive first wireless signals from a wireless base station;
transmit second wireless signals from the multiple repeater wireless stations to a mobile communication device, the second wireless signals being reproductions of the first wireless signals; and wherein phase shifts of the second wireless signals are controlled in time such that the second wireless signals received by the mobile communication device are phase aligned.

21. The system as in claim 20, wherein a magnitude of the phase shifts of the second wireless signals are controlled based on: i) first time of flight distances between the wireless base station and the multiple repeater wireless stations, and ii) second time of flight distances between the multiple repeater wireless stations and the mobile communication device.

22. The system as in claim 20 further comprising:
communication management hardware operative to:
receive first location information indicating locations of each of the multiple repeater wireless stations;
determine first time of flight distances between the wireless base station and the multiple repeater wireless stations based on the first location information; and
control the phase shifts of the second wireless signals in time with respect to the first wireless signals based at least in part on the first time of flight information.

23. The system as in claim 22, wherein the communication management hardware is further operative to:
receive second location information indicating a location of the mobile communication device;
determine second time of flight distances between the multiple repeater wireless stations and the mobile communication device; and
control the phase shifts of the second wireless signals in time based on the second time of flight information.

24. The system as in claim 20 further comprising:
communication management hardware operative to:
communicate phase shift information from the wireless base station to the multiple repeater wireless stations, the multiple repeater wireless stations implementing phase shifts as specified by the phase shift information.

25. The system as in claim 20 further comprising:
communication management hardware operative to:
implement the phase shifts at the wireless base station via phase shifting of the first wireless signals transmitted to the multiple repeater wireless stations.

26. The system as in claim 20, wherein the second wireless signals received by the mobile communication device are substantially in phase with each other.

27. The system as in claim 20 further comprising:
communication management hardware operative to:
determine the phase shifts based at least in part on distances between the multiple repeater wireless stations.

28. The system as in claim 20 further comprising:
communication management hardware operative to:
control transmission of the first wireless signals from the wireless base station such that the first wireless signals are substantially in phase with each other.

29. The system as in claim 20 further comprising:
communication management hardware operative to:
register the wireless base station with an allocation management resource for allocation of a wireless channel in which to transmit the first wireless signals and the second wireless signals.

30. Computer-readable storage hardware having instructions stored thereon, the instructions, when carried out by computer processor hardware, cause the computer processor hardware to control a set of multiple repeater wireless stations to:
receive first wireless signals from a wireless base station;
transmit second wireless signals from the multiple repeater wireless stations to a mobile communication device, the second wireless signals being reproductions of the first wireless signals; and
wherein phase shifts of the second wireless signals are controlled in time via the computer processor hardware such that the second wireless signals received by the mobile communication device are phase aligned.

* * * * *